Patented Oct. 1, 1929

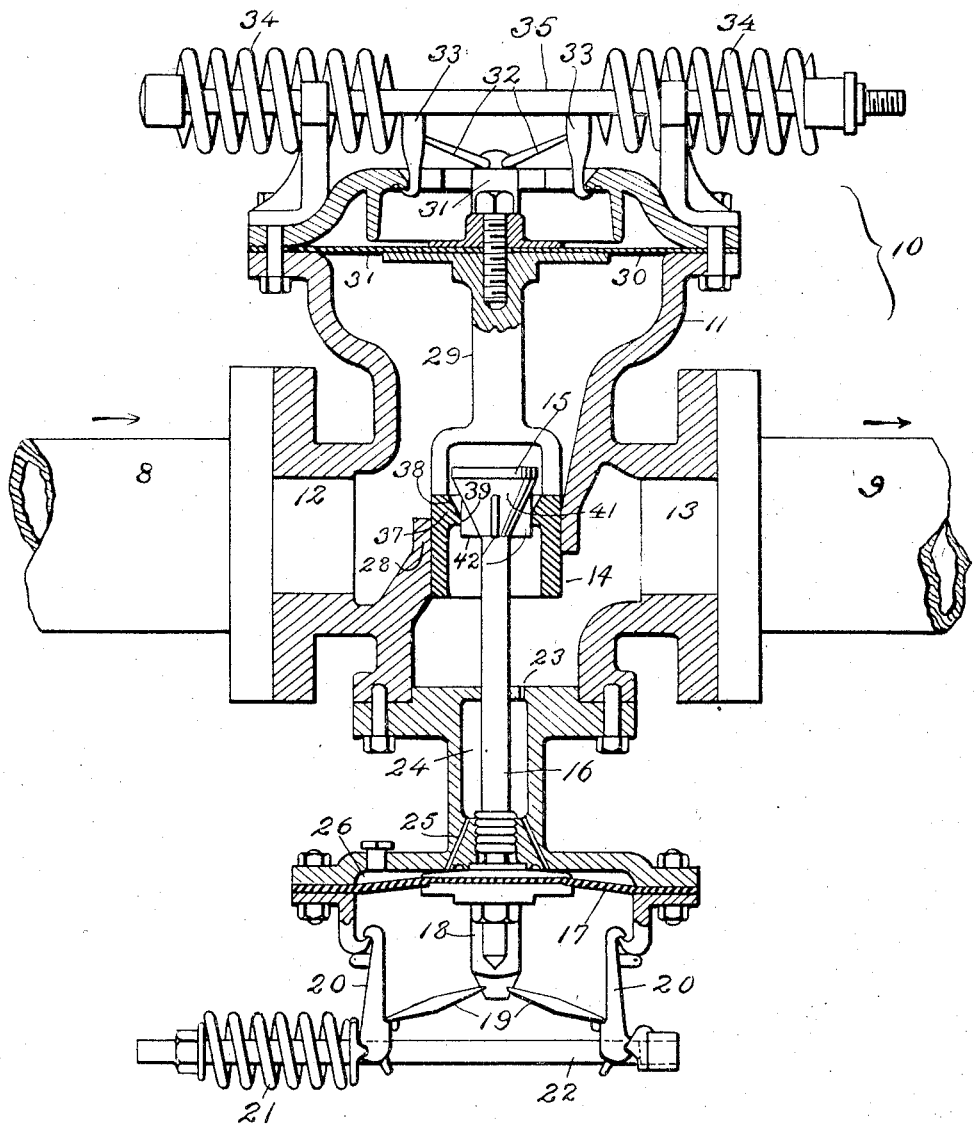

1,729,820

UNITED STATES PATENT OFFICE

GRANT CAMPBELL, OF SHORT HILLS, NEW JERSEY, ASSIGNOR TO CAMPBELL ENGINEERING COMPANY, OF NEWARK, NEW JERSEY, A CORPORATION OF NEW JERSEY

PRESSURE REGULATION

Original application filed June 4, 1924, Serial No. 717,849. Divided and this application filed June 29, 1926. Serial No. 119,345.

This invention relates to pressure regulation, and includes a novel method for regulating pressure, or flow, and a novel apparatus for the same purpose, which may in some cases be embodied in a unitary organization, and termed a reducing valve for convenience. The invention is of utility wherever a predetermined or constant pressure is desired to be delivered, whether high pressure, low pressure or vacuum, referring either to the flow of liquids, or of elastic fluids, exemplified by gases (compressed air) or vapors (steam). The invention is of especial utility where a constant or regulated pressure is desired to be delivered notwithstanding substantial fluctuations of the supply pressure or variations in the source of flow, or changes in the duty or load to be met. The delivery pressure to be controlled is not necessarily that of the fluid itself, but may be the resulting pressure of the operation of a pump, blower or the like. Specific uses of the invention include the following. Controlling the steam or other pressure in heating systems; controlling the feed of water to boilers, in which it may be desired for example to maintain the delivered pressure at the predetermined figure of 15 pounds above the boiler pressure; the control of air feed for purposes of combustion, for example, through a blower engine delivering to a furnace, for regulating or controlling the combustion or resulting steam pressure; and the like.

The main object of the invention is to secure more efficient and reliable regulation of pressure or flow in the above or analogous fields of utility. A specific object is to give better control, or afford better uniformity, of delivered pressure notwithstanding substantial fluctuations of supply pressure. Other and further objects and advangates of the present invention will be explained in the hereinafter following description of one or more embodiments thereof or will be apparent to those skilled in the art. To the attainment of such objects and advantages the present invention consists in the novel method and apparatus for pressure regulation and the novel features of combination, arrangement and construction herein illustrated or described.

In the accompanying drawings the figure shows an illustrative form of the present invention, embodying the apparatus features and available for practising the method features, certain elements of the combination being shown in central cross section to avoid the necessity of separate views thereof In one aspect the essence of the present invention may be stated to consist in the regulation of fluid pressure by adjusting the flow under the control of both the supply pressure and the delivery pressure. In this way the delivery pressure is controlled, not only by the conditions at the delivery side of the control point, but also by the conditions at the supply side. This combined control gives superior results. The instance may be taken where the initial or supply pressure is liable to fluctuate between 55 and 80 pounds per square inch, while it is desired to maintain a delivered pressure of about 30 pounds (29 to 31). Of course predetermined variation or adjustment of the delivered pressure may sometimes be desirable, and is attainable by adjustment of the action of the present invention. A distinct difficulty in maintaining the desired or predetermined delivery pressure is encountered wherever the supply pressure fluctuates substantially, for example as in the instance just mentioned. Where a reducing valve is controlled by the secondary or delivery pressure only it may work satisfactorily so long as the primary or supply pressure is uniform, but with substantial fluctuations the operation is very unreliable. This may be described as due to the fact that the necessary increase of flow, or vice versa, to maintain the desired delivery pressure will not be uniform if the supply pressure varies substantially. With the present invention the flow, or opening or closing of the valve, is controlled not only by the pressure drop or rise at the delivery end, but also by the pressure variations at the supply end. Thus in the case stated if the delivery pressure commences to drop below the desired 30 pounds the flow will be increased by control from the delivery end; and if the supply pressure drops toward 55 pounds this is arranged to effect an increase of flow, or opening of valve, in such manner that the delivered pressure may be maintained at the desired figure.

The drawing shows the supply or primary service pipe 8 and the delivery or secondary pipe 9, and between them the pressure regulating means or valve structure 10. The latter comprises the valve body 11 having inlet and outlet ports 12 and 13 with a valve seat 14 engaged by valve disk 15, the stem 16 of which extends to a diaphragm 17, which in this case may be made of rubber. In using the word diaphragm it will be understood that any equivalent pressure-responsive control device sensitive to fluctuations of pressure is intended to be included. The diaphragm 17 has an exterior stud or projection 18 against which inward pressure is maintained through toggle links 18 operated by levers 20 and by a spring 21 on a transverse stem 22.

The connection from the secondary pressure to the diaphragm may be from the interior of the valve casing through a passage 23 into a chamber 24 surrounding the steam 16, and passages 25 from that chamber into a diaphragm chamber 26. By this arrangement decrease of delivered pressure permits the spring 21 to elevate the diaphragm thus raising the valve disk 15 away from its seat.

The valve seat 14 is movable, sliding in a cylindrical portion 28 of the valve body. The entire flow from supply to delivery side is between the valve seat 14 and disk 15. The flow is increased by the lifting of the disk or by the lowering of the seat or by both; and vice versa. In order to control the movements of the seat it is shown connected by a forked stem 29 with a diaphragm 30, which in this case should be of metal if steam is being handled on account of the direct contact of the steam with the diaphragm. The exterior stud 31 on the diaphragm cooperates with toggle links 32 and levers 33 in such manner that the pressure of springs 34 is constantly applied through stem 35 and the toggle to thrust the diaphragm inward. By this arrangement decrease of primary pressure allows the diaphragm to move inward thus lowering the valve seat 14 and increasing the flow. In this way any material decrease in supply pressure causes the opening of the valve giving an increased flow which may readily be calculated and adjusted to offset substantially the loss of flow through the valve due to the drop of supply pressure, and vice versa. In other words the valve 10 offsets the difficulties arising from variations of supply pressure, making a correction substantially to the desired flow, and thus enabling the secondary control to further correct the delivered pressure to the desired predetermined pressure. The action may be described as increasing the fluid flow correctively upon a decrease of either the supply pressure or the delivery pressure, and vice versa, thereby attaining one of the main objects of the present invention.

The drawing shows a particular form of valve structure which is of advantage for general purposes as well as for the present invention and is considered to be novel per se. Thus the valve seat member 14 is shown as formed with a conical seat 37, the surface 38 of which is tapered to correspond with the taper of the cone of the valve disk, and below the tapered surface 38 is a cylindrical surface 39 sufficiently long for guiding or bearing purposes. The valve disk is formed with a conical body 41 corresponding with the cone 38 of the seat, but the conical body is continued inwardly substantially to the disk stem 16. This conical body is also formed with a plurality of guiding fins 42 arranged to engage the cylindrical surface 39 of the seat, so as to maintain the conical disk in central position throughout its movements.

This form of valve gives efficient differential pressure regulation. The long movement of the adjustment between the closed position of the valve and its maximum open position affords close and accurate regulation. It is well known that a flat disk gives its maximum opening when it has receded about a quarter of the diameter of the opening. With the illustrated valve the increase of flow is progressive through a far longer range of movement, so that the flow regulation is more gradual and accurate. As the conical disk lifts it increases the annular space within the seat, which latter may sometimes be other than conical in shape, and the flow is finely controlled from maximum to minimum. At the same time the two valve parts maintain their concentric relation without other guidance than their contact against each other. In other words the illustration shows a conical valve in which the two valve parts are guided by mutual engagement, the interior part being the conical valve disk, and the valve seat having preferably a conical portion engageable however only with the larger end of the disk, and formed with a guiding portion therebelow, against which the projecting portions or fins of the disk bear during the relative movements of the parts.

It will thus be seen that I have described several embodiments of the underlying principles of the present invention. Since many matters of combination, arrangement, design and detail may be variously modified it is not intended to limit the invention to such matter except so far as specified in the appended claims.

What is claimed is:

1. Apparatus for regulating delivery pressure of fluids comprising a movable valve seat member, a movable valve disk member coacting therewith, automatic means for adjusting one of said members away from the other upon decrease of supply pressure, and vice versa, and automatic means for adjusting the latter thereof away from the former upon decrease of delivery pressure, and vice versa.

2. Apparatus as in claim 1 and wherein the seat and disk members are both conical and the disk cone tapers to a substantially smaller diameter than the seat cone.

In testimony whereof, I have affixed my signature hereto.

GRANT CAMPBELL.